Jan. 31, 1961  O. M. ULBING  2,969,738
FUEL INJECTOR
Filed May 14, 1956
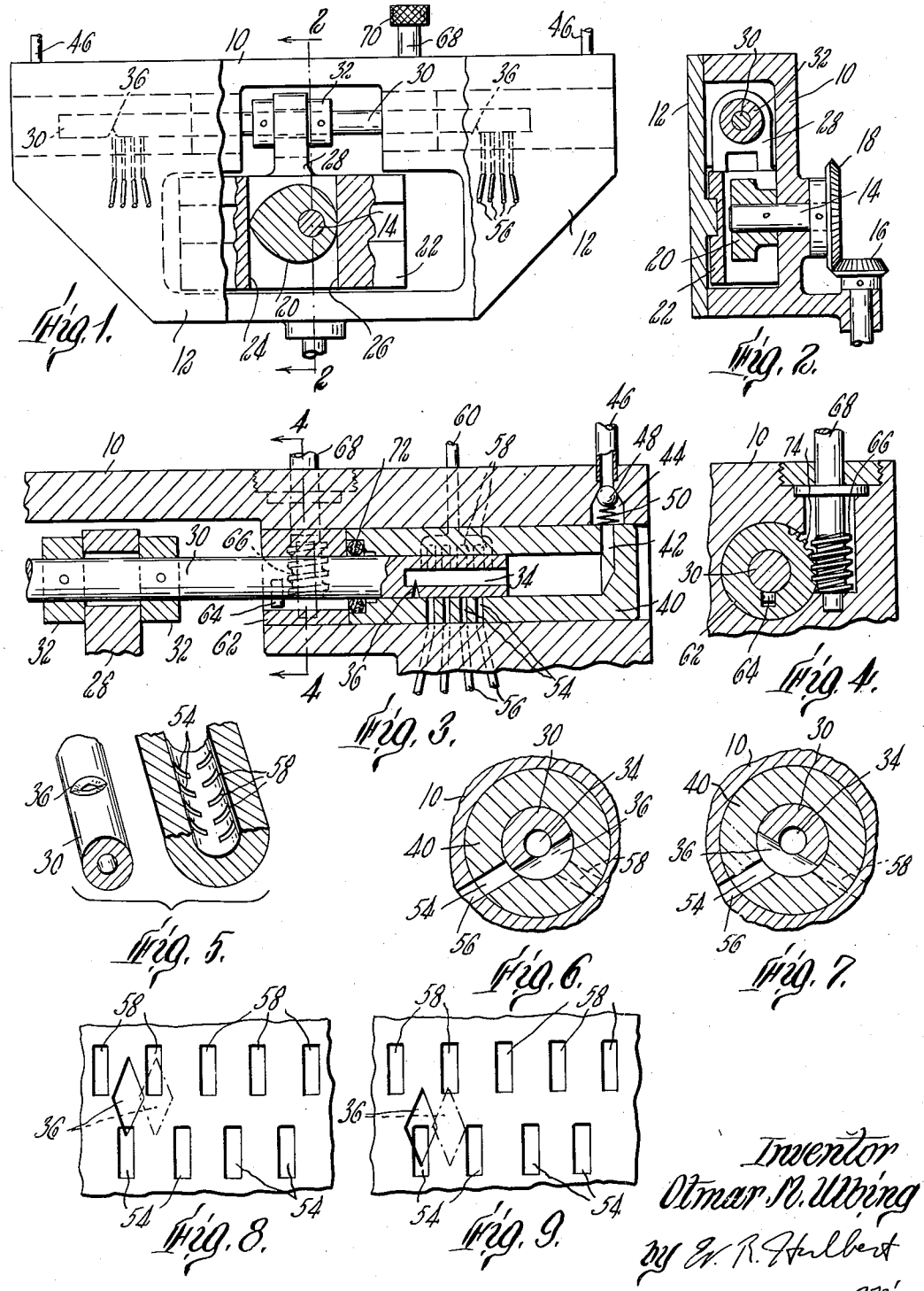
Inventor
Otmar M. Ulbing
by E. R. Hulbert
Atty.

United States Patent Office 2,969,738
Patented Jan. 31, 1961

2,969,738

FUEL INJECTOR

Otmar M. Ulbing, Springfield, Vt.
(R.F.D. 1, Berkshire, N.Y.)

Filed May 14, 1956, Ser. No. 584,572

7 Claims. (Cl. 103—2)

This invention relates to a fuel injector for an internal combustion engine.

It is the object of the present invention to deliver very accurately metered quantities of liquid fuel to either the cylinders or the manifold of an internal combustion engine.

Other objects, advantages, and features will appear from the following description of a preferred embodiment of the invention, taken together with the accompanying drawings thereof, in which:

Fig. 1 is a side elevation view, partially broken away and partially in section;

Fig. 2 is a sectional view, taken on line 2—2 of Fig. 1;

Fig. 3 is an enlarged partial sectional view of a portion of the injector as shown in Fig. 1;

Fig. 4 is a partial sectional view taken on line 4—4 of Fig. 3;

Fig. 5 is a partial isometric disassembled view of the metering element and the distributing element of the novel injector;

Fig. 6 is a partial sectional view through the assembled metering element and distributing element, showing the former adjusted to deliver a relatively small volume through the delivery openings and a relatively large amount through the recycle openings;

Fig. 7 is a view corresponding to Fig. 6, except that the metering element is shown adjusted to deliver a relatively large volume through the delivery openings and a relatively small volume through the recycle openings;

Fig. 8 is a schematic developed view showing the location of the metering passage relative to the delivery openings and recycle openings at the setting of Fig. 6; and Fig. 9 is a schematic developed view showing the location of the metering passage relative to the delivery openings and recycle openings at the setting of Fig. 7.

Referring now to the drawings, my novel injector, as seen in Figs. 1 and 2 includes a housing 10, with removable face plate 12. Mounted within the lower portion of housing 10, for rotation by shaft 14, driven by bevel gear 16 through bevel gear 18 is cam 20. The cam 20 drives the follower 22 back and forth, through alternate pressure on the opposed faces 24 and 26 thereof, being shaped to produce constant velocity motion of the reciprocating follower, with very rapid reversals of direction. Integral with the follower 22 for reciprocation therewith is projection 28, through a hole in which extends the piston, or metering element 30. Piston 30 is held by a pair of collars 32 against projection 28 for reciprocation therewith.

Each end of the metering element 30 is drilled to provide a blind axial hole 34 forming a fuel cavity, as shown in Fig. 3, for one end thereof. Extending through the annular wall between said blind axial hole or fuel cavity 34 and the outer surface of the metering element 30 is a notch 36 defining a generally diamond-shaped metering passage. The metering element 30 at each end thereof slides within a distributing element 40 preferably of nylon or Teflon to eliminate need for lubrication, which is open at its outer end through a fuel inlet 42 and a conduit 44 in enclosure 10 to fuel supply tube 46. A ball 48 biased by spring 50 in the conical portion of hole 44 provides a check valve permitting intake of fuel during a suction stroke in said distributing element, but preventing loss of fuel through the hole 44 during a pressure stroke of the piston 30 therein. The distributing element has at each end thereof along a lower portion thereof a row of four fuel delivery openings 54, which communicate through lengths of tubing 56 with injector nozzles (not shown). Also along a higher portion of said distributing element, at each end thereof, and longitudinally spaced before, between, and after said delivery openings 54 are five relief or recycle openings 58 which communicate through conduit 60 with the fuel reservoir (not shown).

The piston 30 also slides back and forth relative to adjustment bushing 62, but is rotatable therewith through key 64, which is fixed in the piston 30 and slides with it in the bushing 62. Worm 66 can be turned through shaft 68 by knurl 70, to turn bushing 62 through teeth 74 cut thereon.

Between bushing 62 and distributor element 40 is gasket 72, to prevent leakage thereby around piston 30. It will be understood that the arrangement of parts at the end of the piston 30 not shown in Fig. 3 is a mirror image of the arrangement shown, except that there is no second adjustment bushing 62, one thereof taking care of the entire piston 30. At each end is a fuel cavity 34, with a notch 36 correspondingly positioned, and a distributing element 40 with associated parts for intake of fuel, the second fuel supply tube 46 being shown in Fig. 1.

The embodiment shown is for an eight cylinder engine, one of the tubes 56 going to each cylinder thereof, there being of course four of such tubes 56 supplied from each end of the metering element 30.

In operation, the shaft 14 is turned by the internal combustion engine, at an r.p.m. half that of the said engine. In Figs. 1 and 3 the cam follower 22 has been driven by the cam 20 to the extreme leftward position, and in doing so has sucked in through fuel supply tube 46, and past ball 48, overcoming the bias of spring 50, fuel to fill the fuel cavity 30 and the hole 42 in the distributing element 40. The cam 20 then reverses the direction of movement of the piston 30, putting fuel trapped in the fuel cavity 34 under pressure. As said fuel is put under pressure, notch 36 of piston 30 slides over the first relief or recycle hole 58 in the distributing element 40, driving enough fuel therethrough to the fuel reservoir to prevent undesirable pressure build-up. The notch 36 then slides over the first fuel delivery hole 54, and forces therethrough the amount of fuel desired to be injected into one of the cylinders at this time, through an injector nozzle (not shown). The notch 36 then successively slides over another relief opening 58, another fuel delivery opening 54, and so on until the outermost relief hole 58 is reached, the stroke of the piston 30 terminating before the hole 36 therein passes this outermost relief hole. Predetermined amounts of fuel, governed by pressure and opening sizes, are thus delivered successively to four cylinders through the fuel delivery openings 54, with the predetermined timing.

While the right-hand end of the piston 30 was on its pressure stroke within the right-hand distributing element, delivering fuel to four of the cylinders, the left-hand side was of course on a suction stroke in the left-hand distributing element, drawing in fuel. Then as the piston 30 moves to the left again, fuel is delivered to the other four cylinders through four fuel delivery openings in the left-hand distributing element (not shown).

There is never any time during a pressure stroke within a distributing element when the notch 36 in the respective end of the piston 30 is not to some extent at least overlying either a recycle hole 58 or a fuel delivery hole 54. During transitional instants therebetween, said notch 36 may overlie to some extent one opening of each type. Being constantly over one such opening prevents undue pressure build-up in the system.

In order to vary the quantity of fuel injected into cylinders, provision is made through adjustment bushing 62 and associated worm 66 and knurl 70 to vary the extent to which the notch 36 overlies each fuel delivery opening 54 as it slides thereby. In Figs. 6 and 8, the piston 30 has been rotated by means of adjustment bushing 62 and pin 64 so that only a corner of the notch 36 falls over a fuel delivery opening 54 as the metering element 30 slides over the distributing element 40, causing very small amounts of fuel to be injected into each cylinder. In Figs. 7 and 9, the piston 30 has been rotated however so that a much greater portion of the notch 36 overlies the fuel delivery openings 54, and so greater quantities of fuel are delivered. It is apparent that as the speed of reciprocation of the piston 30 increases or decreases, the relative period of time which the notch 36 spends in communication with the delivery openings 54 will respectively decrease or increase, thereby decreasing or increasing the amount of fuel passing into the delivery openings. This effect may be compensated for by operatively connecting the shaft 68 to the engine crankshaft, the engine manifold vacuum, or both, in a manner well known in the art, such that a variation in the engine r.p.m. or manifold vacuum will rotate the shaft 68.

It will be seen that when a lesser portion of the notch 36 overlies the fuel openings 54 as it successively slides by them, a greater portion thereof overlies the relief openings 58, and vice versa. Thus, varying the relative amounts of fuel forced through the fuel delivery openings and the recycle openings automatically prevents undue pressures being built up while at the same time permitting the reciprocating piston 30 to displace at all times the same volume of fuel per minute.

Air leakage into the injection lines is prevented by check valves (not shown) in the injection nozzles (not shown). These check valves also prevent suction of fuel from injection lines and fuel openings 54 on return or suction strokes within a distributing element. If desired further insurance against such suction may be obtained by putting check valves in the ends of fuel cavities 34, to prevent escape of fuel therefrom.

Variations within the spirit of the above invention will occur to those skilled in the art, the described embodiment being illustrative only.

I claim:

1. Apparatus for injecting fuel into an engine which includes a metering element including a fuel cavity and a metering passage therefrom, means for providing fuel under pressure in said fuel cavity, a distributing element having therein a multiplicity of delivery openings and a multiplicity of recycle openings, means to slide said metering element and said distributing element relative to one another, said metering element and said distributing element being disposed adjacent each other such that said metering passage during all conditions of said pressure overlies to some extent at least one of said delivery and recycle openings and not more than one of said delivery and recycle openings except during transitional instants, said metering element closing all the other said delivery and recycle openings, means for sliding said metering element and said distributing element relative to each other to successively bring said metering passage in line with different ones of said delivery and recycle openings, and adjustment means to change the sliding path of said metering passage relative to said delivery openings and said recycle openings, to vary the extent of overlie thereover and thereby vary the relative amounts of fuel forced therethrough.

2. Apparatus for injecting fuel into an engine which includes a piston having in each end thereof a fuel cavity and a metering passage therefrom, means to reciprocate said piston, a pair of distributing elements formed to respectively accept the ends of said piston for reciprocating sliding movement relative thereto to alternately produce suction and pressure therein, each said distributing element having therein a multiplicity of delivery openings and a multiplicity of recycle openings, means for bringing a fuel supply into communication with said distributing elements during periods of said suction therein only, each distributing element being disposed relative to said piston so that each metering passage during all conditions of said pressure in the respective distributing element overlies to some extent at least one of said delivery and recycle openings and not more than one of said delivery and recycle openings except during transitional instants, said piston closing all the other said delivery and recycle openings of said respective distributing element, means for reciprocating said piston within said distributing elements and to successively bring said metering passages in line with different ones of said delivery and recycle openings, and adjustment means for rotating said piston relative to said distributing element to change the sliding path of said metering passages relative to said delivery openings and said recycle openings to vary the extent of overlie thereover and accordingly vary the relative amounts of fuel forced therethrough.

3. Apparatus for injecting fuel into an engine which includes a housing, a cam mounted within said housing for rotation by a shaft extending thereinto, a cam follower mounted within said housing to be driven reciprocatingly by said cam, a piston operatively connected with said cam follower to be driven reciprocatingly thereby, said piston having in each end thereof a blind axial hole defining a fuel cavity and a notch cut transversely in its outer wall defining a metering passage extending from said fuel cavity and through the annular wall surrounding the same, a pair of distributing elements, each said distributing element being secured within opposed ends of said housing and having therein a hole through a first end thereof for slidably accepting an end of said piston to alternately produce suction and pressure therein, each said distributing element having therein a multiplicity of delivery openings and a multiplicity of recycle openings positioned so that continuously throughout a pressure stroke of said piston therein said metering passage associated therewith overlies to some extent at least one said opening and not more than one said opening except during transitional instants, said piston closing all the other said openings of said distributing element, each said distributing element being provided also with a fuel inlet toward a second end thereof for admitting fuel to said hole therein as said piston is withdrawn therefrom in a suction stroke relative thereto, an adjustment bearing seated in said housing for sliding movement of said piston therethrough, said bearing being rotatably adjustable within said housing and being keyed to said piston to rotate the latter therewith to change the sliding path of said metering passages relative to said delivery openings and said recycle openings to vary the extent of overlie thereover and accordingly vary the relative amounts of fuel forced therethrough, and a pair of fuel conduits in said housing for passage of fuel therethrough into said fuel inlets, each said fuel conduit being selectively closed by a check valve during pressure conditions in said fuel inlets of said distributing elements.

4. The apparatus of claim 3 wherein said cam is a linear motion cam shaped to produce constant velocity motion of the reciprocating follower, with rapid reversals of direction.

5. A fuel injection apparatus for injecting fuel into an engine comprising a cylinder having an open end and a closed end and adapted to define a fuel cavity, a fuel supply passageway connected to said fuel cavity adjacent said closed end thereof, a plurality of delivery openings positioned in an axially disposed row in the cylindrical wall of said cavity thereof, and a plurality of recycle openings positioned in a second axially disposed row in said cylinder wall in generally opposed and offset relationship relative to said delivery openings, a piston received in the open end of said cylinder and mounted for axial movement within said cavity, said piston including a generally axially disposed metering passageway adapted to provide communication between said fuel cavity and said openings, said passageway having an inlet aperture in the end of the piston adjacent said closed end of said cavity and an outlet aperture disposed in the cylindrical surface of said piston generally transversely thereof, said outlet aperture being of dimension sufficient to overlie to some extent at least one of said openings and not more than one of said openings except during transitional instants during axial movement of said piston, said piston being adapted to close all the other said openings, means for reciprocatingly driving said piston and said cylinder relative to each other to successively bring said outlet aperture into communication with different ones of said openings, means for rotating said piston to change the sliding path of said outlet aperture relative to said rows of openings for varying the relative amounts of fuel forced through said delivery openings and said recycle openings, and means responsive to the axial movement of said piston for admitting fuel to said cavity through said supply passageway.

6. The fuel injection apparatus as claimed in claim 5 wherein said discharge and recycle openings are generally rectangular in configuration and are disposed in alternating relationship along the axial length of said cylinder and said outlet aperture is generally diamond shaped in configuration so that movement of said piston brings said outlet aperture into alternating communication with delivery openings and recycle openings.

7. A fuel injection apparatus for injecting fuel into an engine comprising a double ended piston mounted for reciprocating motion, a pair of cylinders disposed in axially opposed relationship, each having an open end and a closed end and being adapted to receive the cooperating end of said piston in sealing relationship to define a fuel cavity, a plurality of delivery openings positioned in an axially disposed row in the cylindrical wall of said cavity and a plurality of recycle openings positioned in a second axially disposed row in said cylindrical wall in generally opposed and offset relationship relative to said delivery openings, said openings being generally rectangular in configuration, and a fuel supply passageway connected adjacent the closed end thereof, said piston including a generally axially disposed metering passageway adjacent each end, each said passageway including an inlet aperture in the adjacent end of said piston and an outlet aperture, generally diamond shaped in configuration, disposed in the cylindrical surface of said piston generally transversely thereof, said passageway being adapted to provide communication between said fuel cavity and said openings and said outlet aperture being of sufficient dimension to overlie to some extent at least one of said openings and not more than one of said openings except during transitional instants during axial movement of said piston, said piston being adapted to close all the other said openings, means for reciprocatingly driving said piston for axially moving said piston ends within the respective cylinders to bring said outlet apertures into communication with successive ones of said openings, means for rotating said piston to change the sliding path of said outlet apertures relative to said rows of openings for varying the relative amounts of fuel forced through said delivery openings and said recycle openings during axial movement of said piston, and means responsive to the axial movement of said piston for admitting fuel to said cavity through said fuel supply passageway.

References Cited in the file of this patent

UNITED STATES PATENTS

| | | |
|---|---|---|
| 2,223,755 | Dillstrom | Dec. 3, 1940 |
| 2,223,756 | Dillstrom | Dec. 3, 1940 |
| 2,223,757 | Dillstrom | Dec. 3, 1940 |
| 2,223,758 | Dillstrom | Dec. 3, 1940 |
| 2,274,241 | Lemanski | Feb. 24, 1942 |
| 2,521,119 | Green | Sept. 5, 1950 |

FOREIGN PATENTS

| | | |
|---|---|---|
| 259,660 | Italy | July 21, 1928 |